G. H. F. HOLY.
SHAFT BEARING.
APPLICATION FILED AUG. 28, 1915.

1,183,200.

Patented May 16, 1916.

WITNESSES:
Fred A. Lind.
J. R. Langley.

INVENTOR
George H. F. Holy
BY
Wesley G. Carr
ATTORNEY

UNITED STATES PATENT OFFICE.

GEORGE H. F. HOLY, OF PITTSBURGH, PENNSYLVANIA, ASSIGNOR TO WESTINGHOUSE ELECTRIC AND MANUFACTURING COMPANY, A CORPORATION OF PENNSYLVANIA.

SHAFT-BEARING.

1,183,200.

Specification of Letters Patent.

Patented May 16, 1916.

Application filed August 28, 1915. Serial No. 47,852.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Shaft-Bearings, of which the following is a specification.

My invention relates to shaft bearings, and it has for its object to provide a shaft bearing comprising a minimum number of simple parts that may be readily assembled.

The usual construction of shaft bearings comprises a cast metal housing member and a shaft encircling bearing member composed of some suitable bearing metal disposed within the bore of the housing member. In order to prevent relative displacement of the members, keys or dowel pins are usually provided in the bore of the housing member or on a shoulder of the bearing member.

By my invention, I provide a shaft bearing in which the housing and bearing members are provided with extending portions that are in positive engagement, whereby relative displacement of the members is effectively prevented without the use of any of the well-known retaining or clamping devices hereinbefore described.

Figure 3:
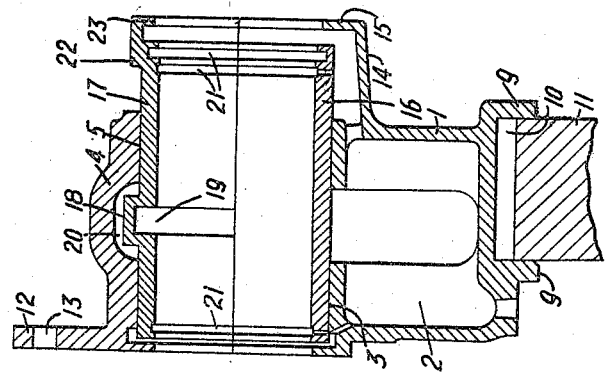
Figure 1:
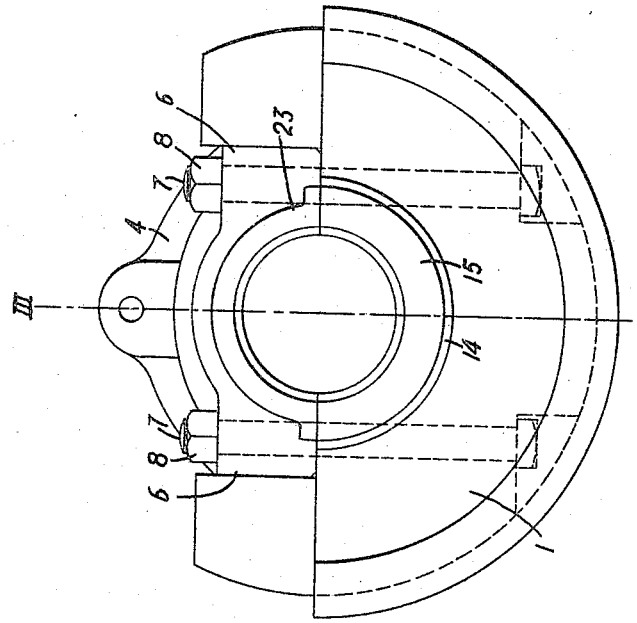
Figure 2:
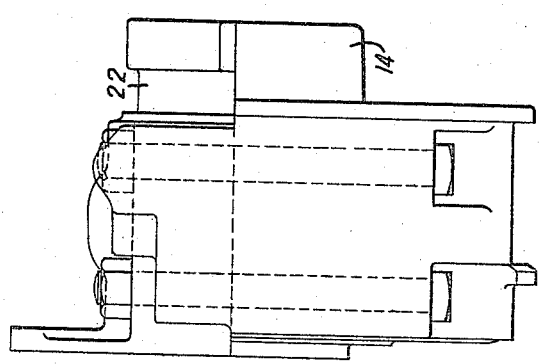

In the accompanying drawings, Figure 1 is a view, in front elevation, of a shaft bearing constructed in accordance with my invention. Fig. 2 is a view, in side elevation, of the parts shown in Fig. 1, and Fig. 3 is a sectional view on the line III—III of Fig. 1.

The shaft bearing comprises a housing member 1 that is formed with an annular oil well 2 and a semi-cylindrical bearing seat 3. A housing cap 4 is formed with a semi-cylindrical bearing seat 5 and outwardly extending wing portions 6. The housing cap 4 is secured to the housing member 1 by means of through-bolts 7 and nuts 8 coöperating with suitable openings provided in the housing member 1 and the wing portions 6 of the cap 4. The housing member 1 is provided with a pair of external flanges 9 forming a groove 10 within which is secured a suitable supporting member 11. The cap 4 is provided with an upwardly extending flange 12 provided with an opening 13 by means of which the shaft bearing housing may be further secured to the frame of the accompanying machine (not shown). The housing member 1 is further provided with a substantially semi-cylindrical extension 14 which terminates in an upwardly extending semi-annular flange 15, the inner diameter of which is somewhat greater than the diameter of the bearing seat 3.

A bearing member formed of some suitable bearing material such as bronze or Babbitt metal comprises two half portions 16 and 17. The half portion 16 is disposed in the bearing seat 3 of the housing member 1 and the half portion 17 is disposed in the bearing seat 5 of the cap 4. The half portion 17 is provided with a boss 18 in which is formed an inner semi-annular groove 19 for the reception of an oil ring (not shown) that is adapted to coöperate with the oil well 2 in a well-known manner. The cap 4 is provided with a recess 20 to receive the boss 18. The half portions 16 and 17 of the bearing are severally provided with oil grooves 21 that are adapted to register with each other when the bearing is assembled. The half portion 17 is further provided with a semi-cylindrical extension 22 that projects beyond the end of the half portion 16 and is in positive engagement with the corresponding semi-cylindrical extension 14 of the housing member 1. The extension 22 is provided with a semi-annular flange 23 the inner diameter of which is equal to the diameter of the flange 15.

From the foregoing, it is apparent that a shaft bearing constructed in accordance with my invention is composed of a small number of simple parts and that relative displacement of the housing and bearing members is effectively prevented by the positive engagement of the semi-cylindrical extensions 14 and 22 of the bearing member 1 and of the upper half portion 17 of the bearing respectively.

While I have shown my invention in a simple and preferred form and as applied to a split shaft bearing, it is apparent that it may be as readily embodied in a shaft bearing comprising solid housing and bearing members and I desire that only such limitations may be imposed thereon as may come within the scope of the appended claims.

I claim as my invention:

1. A shaft bearing comprising a supporting member and an inner shaft encircling member, the said members having engaging portions to prevent relative displacement of the said members.

2. A shaft bearing comprising a supporting member and an inner shaft encircling member, the said members having extending portions adapted to engage each other to prevent relative displacement of the said members.

3. A shaft bearing comprising a supporting member and an inner shaft encircling member, the said members severally having an extending portion adapted to engage a corresponding extending portion on the other of said members to prevent relative displacement of the said members.

4. A shaft bearing comprising a housing member having a cylindrical seat and a semi-cylindrical portion extending therefrom, and a cylindrical bearing member disposed within the said seat, the said bearing member being provided with a semi-cylindrical portion extending beyond the said seat and in engagement with the said first named portion to prevent relative displacement of the said members.

5. A shaft bearing comprising a housing member having a bearing seat and an extending portion and a bearing member disposed within the said seat, the said bearing member being provided with a portion extending beyond the said seat and in engagement with the said first named extending portion to prevent relative displacement of the said bearing and housing members.

In testimony whereof, I have hereunto subscribed my name this 19th day of August, 1915.

GEORGE H F. HOLY.

Copies of this patent may be obtained for five cents each, by addressing the "Commissioner of Patents, Washington, D. C."